Figure 1:
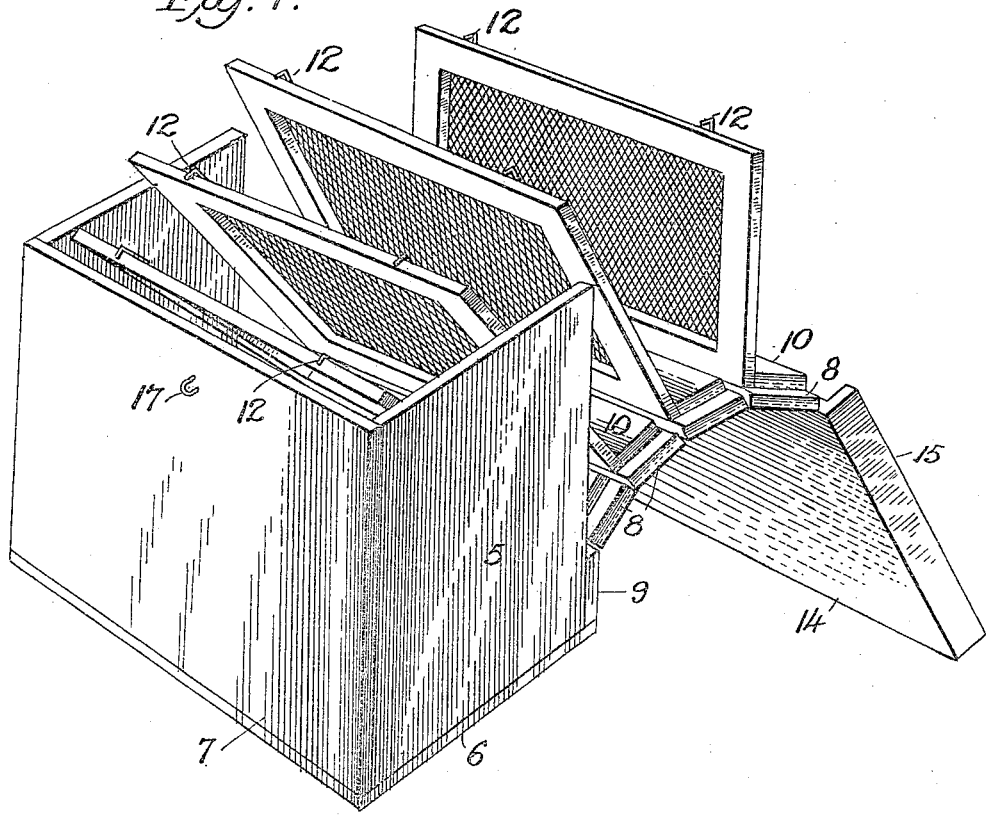

E. E. WARD.
EGG CRATE.
APPLICATION FILED JULY 28, 1908.

932,922.

Patented Aug. 31, 1909.

WITNESSES

INVENTOR,
Ernest E. Ward,
BY
Victor J. Evans
ATTORNEYS

UNITED STATES PATENT OFFICE.

ERNEST ERWIN WARD, OF HARRISON, MAINE.

EGG-CRATE.

932,922.  Specification of Letters Patent.  Patented Aug. 31, 1909.

Application filed July 28, 1908. Serial No. 445,764.

*To all whom it may concern:*

Be it known that I, ERNEST E. WARD, a citizen of the United States, residing at Harrison, in the county of Cumberland and State of Maine, have invented new and useful Improvements in Egg-Crates, of which the following is a specification.

Figure 2:
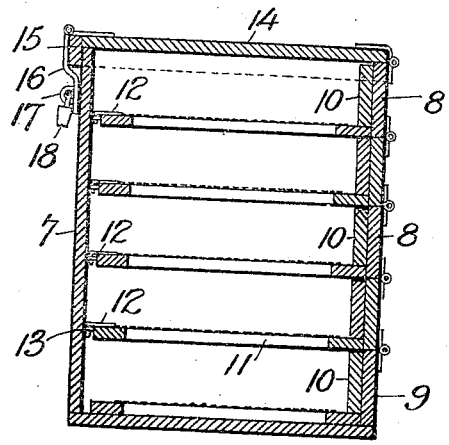

This invention relates to egg crates and has for its object the construction of a box for carrying eggs which is made up of a number of separate trays or partitions for containing the eggs and are capable of being removed and folded backward while still attached to the side of the box so that access may be had to the successive layers to pack or remove the eggs and the trays will not be lost or subjected to the chances of destruction which the trays would run if they were detached, as will be more fully described in the following specification, set forth in the claims, and illustrated in the drawings, where:

Figure 1 is a perspective view of the improved crate. Fig. 2 is a cross sectional view.

My improved crate comprises a protecting box of novel construction and a series of trays disposed in the said protecting box and which may be readily exposed when the protecting box is open, as hereinafter described.

The ends 5, the bottom 6 and the front side 7 of the protecting box of this improved crate are secured together while the back is formed of a series of slats 8 hinged together, the lower one 9 being secured firmly to the box while the others may be folded backward as shown in Fig. 1 or up to form the usual back. To the inner side of each of these sections is secured a strip 10 and to the under side of which is secured one of the side pieces of the tray 11 while its opposite side carries hooks 12 that engage staples 13 in the front side of the crate when the trays are in position to carry the eggs.

To the upper section 8 is hinged the lid 14 having side strips 15 and a hasp 16 to fit down over a staple 17 where it is held by the pad-lock 18 and the whole box made a compact and substantial box capable of withstanding considerable wear and tear.

The eggs are deposited in any desired manner on the trays and preferably separated by partitions to keep them from breaking while a bottom and top of wire netting will form a resilient support for the eggs to protect them. The trays are arranged about as far apart as the length of an egg so the eggs may be carried on their ends or otherwise.

When the crate is to be unpacked the trays are emptied one at a time and folded back so that access is given to the next lower tray.

The parts may be modified or rearranged if found advisable without departing from the essential features above described.

While the trays are shown as being made of a wire mesh it is obvious that any desired form of tray may be adopted as this construction permits of the use of all styles.

What I claim as new and desire to secure by Letters Patent is:

1. In an egg crate, the combination with a protecting box comprising a side, bottom and ends, of a side made up of hinged sections, a lid secured to the top hinged section, a tray secured to each section, and means for securing the trays to the box.

2. In an egg crate, the combination with a protecting box made up of a front side having securing means, the ends and the bottom secured together, of a rear side made up of hinged sections, a lid secured to the rear side, and trays secured to the sections and adapted to engage the said securing means on the front side.

3. In an egg crate, the combination with a series of hinged sections, of trays secured to the sections, a lid for the top section, a protecting box carrying the hinged sections and enveloping the trays, staples on the inside of the box and hooks on the trays to engage the staples on the box to lock them therein.

4. In an egg crate, the combination with a protecting box comprising a bottom, the ends and a side, of a series of hinged sections attached to the bottom of the box and forming the rear side, trays projecting inward from each section, hooks at the front end of the trays to secure them successively to the front side of the box, staples in the front side for the hooks and a top with locking means hinged to the upper tray.

In testimony whereof I affix my signature in presence of two witnesses.

ERNEST ERWIN WARD.

Witnesses:
 WILLIAM S. KIMBALL,
 NETTIE M. KIMBALL.